Sept. 5, 1961 H. G. SPENCER 2,998,991
SEALING RINGS
Filed Oct. 25, 1957

INVENTOR.
HARVEY G. SPENCER
BY
ATTORNEYS

United States Patent Office 2,998,991
Patented Sept. 5, 1961

2,998,991
SEALING RINGS
Harvey G. Spencer, La Mirada, Calif., assignor to the United States of America as represented by the Secretary of the Air Force
Filed Oct. 25, 1957, Ser. No. 692,507
7 Claims. (Cl. 288—17)

The present invention relates generally to sealing means, and as illustrated herein, relates more particularly to molded packing rings or gaskets for use in preventing leakage of corrosive fluids.

Corrosive fluids, such as fuming nitric acid, are used as oxidants for jet or rocket fuels and are pumped into the combustion chamber under substantial pressure. Under such conditions, it is difficult to prevent leakage of such fluids past the wear ring mounted on the impeller shaft or on the housing of a turbo-pump.

One object of the present invention is to provide sealing means which will reduce such leakage to a minimum. To this end, and in accordance with one feature of the invention, a laminated structure formed of corrosive material and having a wear surface formed of relatively soft synthetic plastic material is provided as a seal between relatively movable parts of a turbo-pump.

Another object of the invention is to provide a seal which is serviceable over a wide temperature range. To this end, the invention contemplates the provision of a wear ring seal having a thermal coefficient expansion substantially the same as the metal parts which are to be sealed. As illustrated, the wear ring is formed of sheets of fiberglass cloth laminated between sheets of rubber-like plastic and having a wear surface formed of the same or similar material laminated to either the inner or the outer periphery of the laminated wear ring.

With the above and other objects and features in view, the invention will now be described with particular reference to the accompanying drawings which illustrate a preferred embodiment thereof, and in which.

Figures 1, 2, 3:
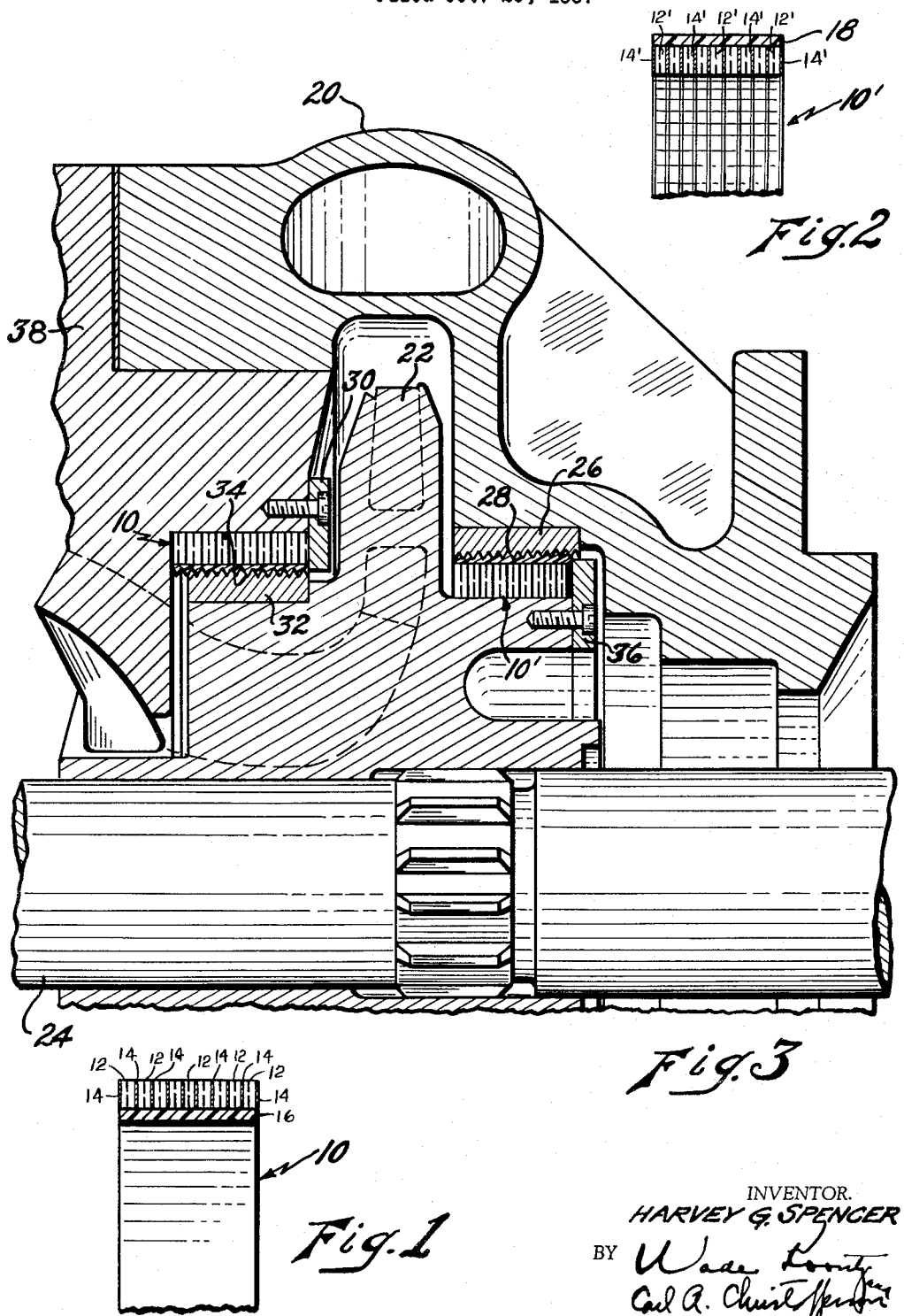
FIG. 1 is a view in section of a wear ring illustrating one embodiment of the present invention.
FIG. 2 is a view similar to FIG. 1 but illustrating another embodiment.
FIG. 3 is a view, partly in section, of a device in which the present invention is incorporated.

The present invention is concerned with preventing or reducing leakage of fuming nitric acid or other corrosive liquids past the wear ring mounted either on the impeller shaft or on the housing of a turbo-pump. It is important that this leakage be held at a minimum over a wide temperature range and, accordingly, it is important that the wear ring be made of material having a thermal coefficient of expansion substantially the same as the aluminum or aluminum alloy of which the pump parts are made.

The wear ring 10 comprises a plurality of annular pieces 12 of fiberglass cloth which are laminated between thin sheets 14 of a fluorine containing compound such as "Teflon" (tetrafluoroethylene) or "Kel–F" (trifluorochloroethylene) until a ring of the desired width or thickness is produced.

In the construction shown in FIG. 1, the inner edge portion of the ring 10 is provided with a wear layer 16 formed of Teflon or Kel–F. The plies of fiberglass cloth 12, the plastic sheets 14 and the wear ring 16 are molded into one integral structure. The construction shown in FIG. 2 differs from that shown in FIG. 1 by placing the wear layer 18 on the outside of the laminated ring. The glass cloth together with the two named plastic materials provide a seal ring 10 having a unique combination of characteristics. The thermal coefficient of expansion of the ring 10 is substantially equal to that of aluminum. The Teflon or Kel–F layers 16 or 18 are soft, very resistant to fuming nitric acid and many other corrosive chemicals, and will not cause galvanic action.

Wear rings of the type disclosed above are particularly adapted for use as seal rings for impellers to prevent leakage of highly corrosive fluids. FIG. 3 shows one type of pump having an aluminum housing 20 and an aluminum impeller 22 mounted on a shaft 24. Adjacent to one end of the impeller 22, an aluminum bushing 26, having its inner surface serrated to form a series of parallel V-shaped grooves 28, is shrunk fitted into a seat in the housing 20. The annular wear or seal ring 10' rotates inside of the bushing 26 and is held in place on the impeller 22 by a locking ring 36. The inner surface of the bushing 26 and the outer face of the ring 10' may be machined with little or no initial clearance. The clearance between the crown of the annular teeth of the bushing 26 and the plastic face of the wear ring 10' determines the rate of leakage. Because the plastic is soft compared to the aluminum, and if the two parts should interfere during rotation, the teeth in the bushing 26 will displace a groove in the outer portion of the plastic portion 18 of the wear ring 10'. This provides the minimum clearance which is possible with the existent eccentricities of the parts involved.

The ring 10 is shown in FIG. 3 as interposed between the impeller housing 20 and an aluminum bushing 32 which is shrunk into the impeller 22. The bushing 32 is provided with a series of parallel grooves 34 on its outer face. The clearance between the plastic portion 16 of the wear ring 10 and the outer serrated face of the bushing 32 is at a minimum. As in the case of the ring 10', the serrated or toothed portion of the bushing 32 will displace a groove in the plastic portion 16 of the wear or seal ring 10. The wear ring 10 is clamped in position on a stationary portion 38 of the impeller 22 by a clamping or locking ring 30.

The advantages of the wear rings 10 and 10' described above are such that leakage of the fluid being pumped is substantially eliminated. Because of the fact that the thermal coefficient of expansion of the plastic glass cloth laminate is substantially the same as that of aluminum, a liquid tight seal over a wide temperature range (−350° F. to 250° F.) is possible. Furthermore, Kel–F and Teflon have low temperature toughness and are capable of continuous service at high temperatures above 250° F. These materials are wear resistant by reason of their toughness and by reason of the non-adhesive character of their surfaces.

While the invention has been described with particular reference to two specific embodiments thereof and with particular reference to providing a seal for corrosive liquids, it is evident that the invention may take other forms and may be used in connection with any type of material, corrosive or non-corrosive.

Having thus described my invention what I claim as new and desire to secure by Letters Patent of the United States is:

1. A seal having a uniform coefficient of expansion throughout and being particularly adapted to prevent leakage of fluid past a pair of relatively movable members operating under widely varying temperature conditions, said seal comprising a plurality of annular plies of fibrous material bonded together in superimposed relationship with a common axis to form a tube having inner and outer peripheries formed by the inner and outer circumferences of said respective plies, a resilient halogenated polyethylene compound bonding said plies together, and an annular layer of said halogenated polyethylene compound bonded to at least one of said peripheries to form a tube having the same axis as said first mentioned tube, said annular layer being of sufficient thickness to provide a deformable layer in contact with said movable members to provide a continuous sealing contact therebetween.

2. A seal in accordance with claim 1 wherein the fibrous material is a fiberglass cloth.

3. A seal in accordance with claim 1 wherein said compound is polytetrafluoroethylene.

4. A seal in accordance with claim 1 wherein said compound is polytrifluoroethylene.

5. A seal in accordance with claim 1 wherein the annular layer is bonded to the inner periphery of said annulus.

6. A seal in accordance with claim 1 wherein the annular layer is bonded to the outer periphery of said annulus.

7. A seal having a uniform coefficient of expansion throughout and being particularly adapted to prevent leakage of fluid past a pair of relatively movable members operating under widely varying temperature conditions, said seal comprising a plurality of annular plies of fibrous material bonded together in superimposed relationship with a common axis to form a tube having inner and outer peripheries formed by the inner and outer circumferences of said respective plies, a resilient halogenated polyethylene compound bonding said plies together, and a deformable annular layer of said halogenated polyethylene compound bonded to at least one of said peripheries to form a tube having the same axis as said first mentioned tube, and said annulus being mounted with its periphery with the annular layer in contact with one of said movable members and the other periphery in contact with the other of said movable members thereby providing a continuous sealing contact therebetween.

References Cited in the file of this patent

UNITED STATES PATENTS

| | | |
|---|---|---|
| 2,301,654 | Yauch | Nov. 10, 1942 |
| 2,373,443 | Armington | Apr. 10, 1945 |
| 2,459,720 | Poltorak | Jan. 18, 1949 |
| 2,537,230 | Mueller | Jan. 9, 1951 |
| 2,539,329 | Sanders | Jan. 23, 1951 |
| 2,639,198 | Kirkham | May 19, 1953 |
| 2,642,370 | Parsons et al. | June 16, 1953 |
| 2,731,068 | Richards | Jan. 17, 1956 |
| 2,750,212 | Skinner | June 12, 1956 |
| 2,907,612 | White | Oct. 16, 1959 |